(No Model.) 4 Sheets—Sheet 1.
J. J. COURTNEY.
MOWING MACHINE.

No. 442,573. Patented Dec. 9, 1890.

Witnesses,
Chas A Sanborn
J. A. Paddock

Inventor,
John J Courtney
By his Attorney
D Strunk (No Model.) 4 Sheets—Sheet 3.

J. J. COURTNEY.
MOWING MACHINE.

No. 442,573. Patented Dec. 9, 1890.

Witnesses.
Chas A Sanborn
J. A. Paddock

Inventor.
John J Courtney
By his Attorney.

(No Model.)  J. J. COURTNEY.  4 Sheets—Sheet 4.
MOWING MACHINE.
No. 442,573.  Patented Dec. 9, 1890.
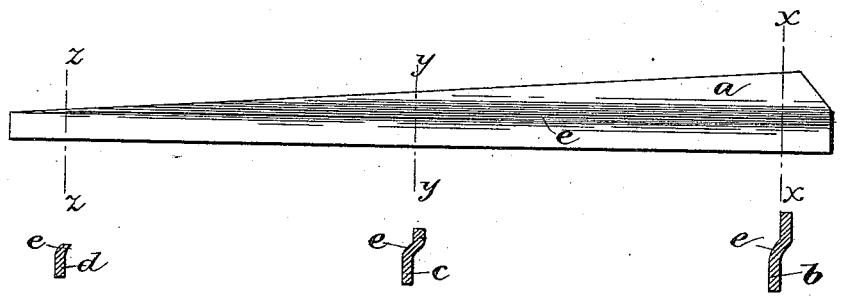
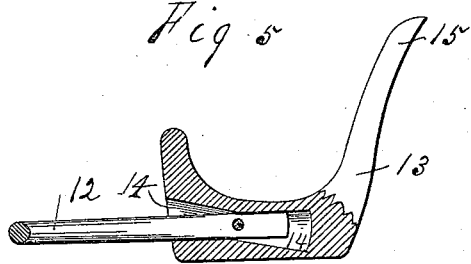
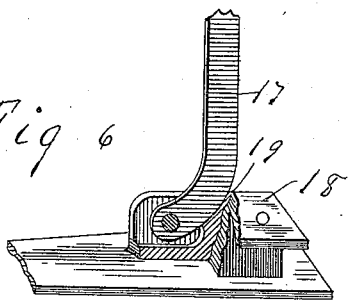
Witnesses.
Chas A Sanborn
J. A. Paddock
Inventor,
John J. Courtney
By his Attorney.

UNITED STATES PATENT OFFICE.

JOHN J. COURTNEY, OF MINNEAPOLIS, MINNESOTA.

MOWING-MACHINE.

SPECIFICATION forming part of Letters Patent No. 442,573, dated December 9, 1890.

Application filed August 9, 1890. Serial No. 361,556. (No model.)

*To all whom it may concern:*

Be it known that I, JOHN J. COURTNEY, a citizen of the United States, residing at Minneapolis, in the county of Hennepin and State of Minnesota, have invented new and useful Improvements in Mowing-Machines, of which the following is a specification.

My invention relates to that class of mowing-machines known as "floating finger-bar" machines, in which a spring is used to support a portion of the weight of the cutting apparatus from the main frame for purposes, it is thought, now too well known to need explanation; and it consists in peculiar devices for so supporting the cutting apparatus, and in other devices for raising the cutting apparatus above the ground with the foot for passing obstructions, &c., thereby dispensing entirely with the usual hand-raising lever, thereby leaving both hands of the operator at liberty to manage the team, and in certain other devices which are fully described in the following specification, all of which devices combine to reduce the weight, complicity, and cost of a mowing-machine, and increase its efficiency and durability.

Figure 1:
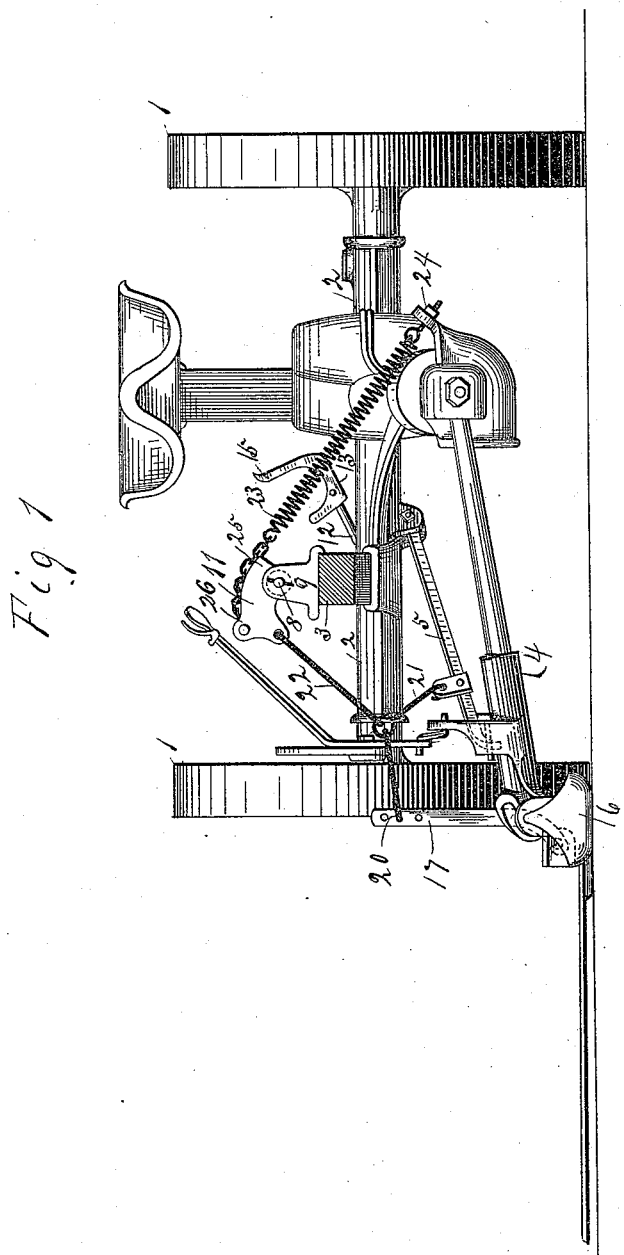
Figure 2:
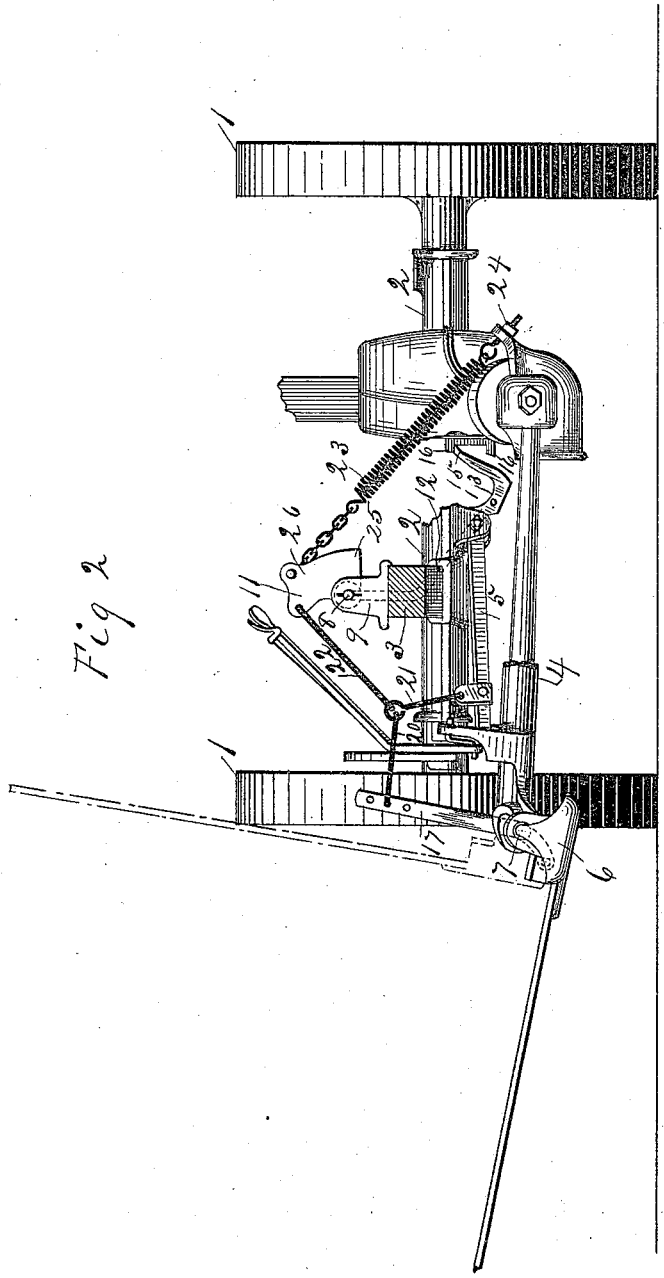
Figure 3:
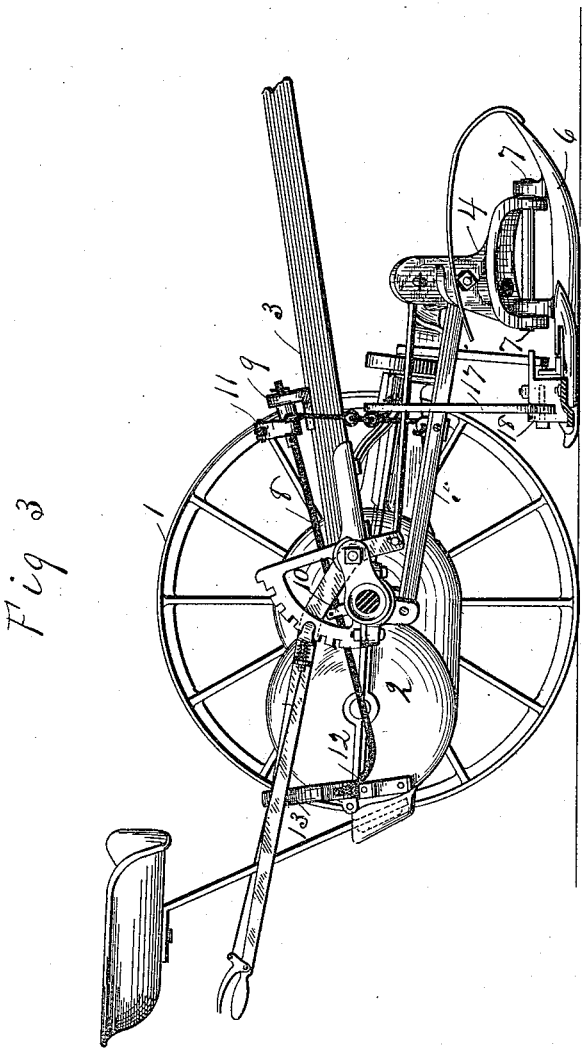

In the drawings, Figure 1 is a front view of the machine, with the cutting apparatus in a working position. Fig. 2 is a front view with the cutting apparatus raised above the ground as if to pass an obstruction or for transportation. In this view a portion of the main frame is broken away to show the latching device which maintains the cutting apparatus in the elevated position shown, and the broken lines show the position of the finger-bar when folded. Fig. 3 is a view from the grass side of the machine, with the cutting apparatus in a working position, with the main wheel at the grass side of the machine omitted. Fig. 4 shows an improved form of finger-bar designed to have greater stiffness in a vertical direction without increasing the thickness or materially adding to the weight thereof. Fig. 5 is a detail showing the construction of the latching device, and Fig. 6 is a detail of the lower end of a pivoted lever and its connection to the cutting apparatus.

In the several figures, 1 1 are the main wheels; 2, the main frame; 3, the pole; 4, the coupling-bar; 5, the push-bar, forming with the coupling-bar 4 the usual coupling-frame; 6, the main shoe to which the finger-bar is attached, and which is pivoted to the coupling-bar 4 by the hinge 7, Fig. 3.

The cutting apparatus may be of any approved construction and hinged to the main frame in any effective manner.

8 is a rock-shaft located above the pole and is substantially parallel therewith.

9 is a bearing secured to the pole at the forward end of the rock-shaft 8, and 10 another bearing for the said rock-shaft upon the main frame of the machine at the rear of the pole 3. (Best shown in Fig. 3.) In these bearings the rock-shaft 8 is free to make a partial rotation upon its axis. Upon the forward end of the rock-shaft 8 there is secured a cam-lever 11. A portion of the rear end of the rock-shaft is turned stubbleward, as shown by dotted lines in Fig. 2, to form a bell-crank 12. The bell-crank 12 has pivoted at its end a foot-piece 13, which is formed with an opening 14 therein, enlarged at each extremity, wherein the bell-crank is pivoted, as shown in Fig. 5, a portion of the foot-piece being broken away to show the form of the opening 14. Upon its pivotal connection to the bell-crank 12 the foot-piece 13 is free to rock to an extent limited by the enlarged extremities of the opening 14, as shown in Fig. 5, or by any other suitable means, and the rocking movement is effected in either direction, as the pressure of the foot is applied either at one side or the other of its pivotal joint.

The foot-piece 13 has a projection 15 thereon, adapted to engage with projections 16 on the main frame of the machine, as shown in Fig. 2, whereby the device is latched or locked in the position shown.

17 is an upright lever, provided with a series of holes at its upper end, as shown, pivoted to a cap 18 on the upper side of the main shoe 6.

In Fig. 6 a portion of the cap 18 is broken away to show a shoulder 19, against which the lever 17 bears to limit its stubbleward movement and confine it to a substantially upright position.

20 is a link connected at one end to the upright lever 17 by one of the series of holes in the upper end thereof, whence it extends stubbleward in a substantially horizontal direction and is connected at its stubbleward end to the upper end of a substantially vertical link 21, which link 21 is connected at its lower end to the push-bar 5.

22 is another link, which has one end also connected to the upper end of the vertical link 21, whence it extends in an oblique upward direction stubbleward to the cam-lever 11, to which it is connected, as shown, or in any other suitable manner.

It is obviously immaterial in just what manner the links 20, 21, and 22 are connected together, as also in what manner the opposite ends of the said links are connected to the several parts mentioned, the chief requirement being that the connections shall be made so as to admit a free movement of the parts, although the manner shown is preferred.

23 is a coiled spring attached at one end by the adjustable connection 24 to the main frame 2 and at the other end by a chain or its equivalent to the cam-lever 11, which is so formed that when the cutting apparatus is in a working position, as in Fig. 1, with the spring 23 extended to nearly its greatest limit, and therefore under nearly its greatest tension, the retracting power of the said spring is applied to the said cam-lever at a point 25 nearest the center of oscillation of the said cam-lever, and when the cutting apparatus is raised from the ground to nearly its greatest height, as shown in Fig. 2, the spring 23, which is retracted to nearly its greatest limit, and is therefore under nearly the least tension, has its retracting power applied to the cam-lever 11 at a point 26 farthest from the center of oscillation of the said cam, whereby nearly an unvarying degree of power is transmitted from the spring 23 to the cutting apparatus whether the said spring be under its greatest, its least, or any intermediate degree of tension.

The retracting power of the spring 23 transmitted to the cutting apparatus through the links 21 and 22 and the push-bar 5 and coupling-bar 4 in an upward direction tends to raise the inner or stubble end of the said cutting apparatus, and the power transmitted through the link 25 to the lever 17 in a nearly horizontal direction tends to raise the outer or grass end of the cutting apparatus by rocking the same upon the hinge-joint 7. The proper proportion of the power thus transmitted to the inner and outer ends of the cutting apparatus is adjusted by means of the series of holes at the upper end of the pivoted lever 17, through which the link 20 is connected thereto and by which the power of the spring is applied at a greater or smaller distance from the hinge-joint 7. The amount of power transmitted from the spring to the cutting apparatus through the several connections is regulated by the adjustable connection 24 of the spring 23 with the main frame 2. The adjustable connection 24 may be made in any well-known manner, although I prefer a threaded eyebolt and adjusting-nut, as shown.

It is well known that when a finger-bar is supported at both ends by a spring from the stubble end thereof the lifting action of the spring tends to curve a considerable central portion of the bar upward and thereby prevent the same from lying flat and close to the ground, as it should do, and this is particularly the case with very long finger-bars, which it is also the most desirable to so support. To overcome this difficulty I have designed the finger-bar, of which $a$ in Fig. 4 is a plan view, and $b$ $c$ $d$ vertical cross-sections on the lines $x$ $x$, $y$ $y$, and $z$ $z$, respectively.

$e$ $e$ $e$ is an offset running lengthwise of the bar, parallel with the front edge thereof, whereby that portion of the finger-bar at the rear of the offset $e$ occupies a lower horizontal position than the front portion, as shown at $b$ and $c$. The finger-bar is so proportioned that at the stubble end thereof the portion at the rear of the offset $e$ substantially equals in width the portion in front of the said offset, but tapers to nothing at the grass end, as shown, thus making the rear horizontal portion triangular in form. The offset $e$ is of the same thickness as the horizontal front and rear portions of the bar, and is joined thereto at an obtuse angle, as shown at $b$ and $c$, Fig. 4, to facilitate the passage of the finger-bar over the ground and remove liability of earth to accumulate on the offset $e$.

In a working position the cutting apparatus of the mower rests upon the ground with the several parts occupying the positions shown in Figs. 1 and 3. To raise the cutting apparatus from the ground the operator presses downward with his foot upon the foot-piece 13, thereby turning the rock-shaft 8, and with it the cam-lever 11 in a stubbleward direction, thus drawing upward the links 22, 21, and 20, and thereby raising the cutting apparatus. As before explained, the power applied to the upright lever 17 tends to raise the outer or grass end of the cutting apparatus, and that applied to the push-bar 5 tends to raise the inner or stubble end with the result that when the cutting apparatus is raised from the ground by the operator both ends thereof are raised concurrently in whatever position they may be when the operation is performed. If it is desired to lock or latch the cutting apparatus in a raised position, the operator presses down with his foot upon the foot-piece 13 until the projection 15 of the foot-piece engages with one of the projections 16 on the main frame, as shown in Fig. 2.

Having thus described my invention, what I claim as new, and desire to secure by Letters Patent, is—

1. The combination, in a mowing-machine, of a cutting apparatus hinged to a coupling-bar, an upright lever pivoted to the cutting apparatus, a shoulder or stop to limit the stubbleward movement of the pivoted lever, a rock-shaft mounted upon the pole and substantially parallel therewith, a cam-lever secured to the forward end of the rock-shaft, a bell-crank at the rear end of the rock-shaft, a foot-piece pivoted to the bell-crank, and a connecting device having three members, one of which is connected to the cam-lever, one to the push-bar, and the other to the upright pivoted lever, substantially as described.

2. The combination, in a mowing-machine, of a cutting apparatus hinged to a coupling-bar, an upright lever provided with adjusting-holes at its upper end pivoted to the cutting apparatus, a stop to limit the stubbleward movement of the pivoted lever, a rock-shaft mounted upon the pole and substantially parallel therewith, a cam-lever secured to the forward end of the rock-shaft, a bell-crank at the rear end of the rock-shaft, a foot-piece pivoted to the bell-crank, a connecting device having three members, one of which is connected to the upright pivoted lever, one to the push-bar, and the other to one arm of the cam-lever, and a spring at the stubbleward side of the pole, having one end connected to the other arm of the cam-lever and the other end to the main frame, substantially as described.

3. The combination, in a mowing-machine, of a cutting apparatus hinged to a coupling-bar, a rock-shaft mounted upon the pole and substantially parallel therewith, a cam-lever secured to the forward end of the rock-shaft, a bell-crank at the rear end of the rock-shaft, a foot-piece pivoted to the bell-crank, a projection upon the foot-piece, projections upon the main frame, with which the latter may engage, a spring at the stubbleward side of the pole, having one end connected to the main frame and the other end to one arm of the cam-lever, and a link or links or their equivalent connecting the other arm of the cam-lever to the cutting apparatus.

4. The combination, in a mowing-machine, of a cutting apparatus hinged to a coupling-bar 4, a push-bar 5, a pivoted lever 17, connecting-links 20, 21, and 22, the cam-lever 11, the spring 23, the rock-shaft 8, the bell-crank 12 thereon, the foot-piece 13, with the projection 15 thereon, pivoted to the bell-crank, and the projections 16 on the main frame, with which the projection on the foot-piece may engage, all substantially as described.

5. The combination, in a mowing-machine, of a cutting apparatus hinged to a coupling-bar, an upright lever pivoted to the cutting apparatus, a shoulder to limit the stubbleward movement of the pivoted lever, a rock-shaft mounted upon the pole and substantially parallel therewith, a cam-lever secured to the forward end of the rock-shaft, a bell-crank at the rear end of the rock-shaft, a foot-piece pivoted to the bell-crank, a connecting device having three members, one of which is connected to the cam-lever, one to the push-bar, and the other to the upright pivoted lever, and a finger-bar provided with an offset therein, whereby increased rigidity is imparted thereto, substantially as and for the purpose described.

JOHN J. COURTNEY.

Witnesses:
GEORGE A. HANSON,
C. M. CASTLE.